(12) United States Patent
Rieger et al.

(10) Patent No.: US 9,260,998 B1
(45) Date of Patent: Feb. 16, 2016

(54) AIRSTREAM TREATMENT APPARATUS (ATA) AND METHODS OF USE THEREOF

(71) Applicant: Paradigm of New York, LLC, Rochester, NY (US)

(72) Inventors: Neville F. Rieger, Pittsford, NY (US); John H. Erbland, Fairport, NY (US)

(73) Assignee: Paradigm of New York, LLC, Rochester, NY (US)

( * ) Notice: Subject to any disclaimer, the term of this patent is extended or adjusted under 35 U.S.C. 154(b) by 0 days.

(21) Appl. No.: 14/072,577

(22) Filed: Nov. 5, 2013

Related U.S. Application Data

(60) Provisional application No. 61/722,404, filed on Nov. 5, 2012.

(51) Int. Cl.
*B01J 19/08* (2006.01)
*B01J 19/12* (2006.01)
*F01N 3/08* (2006.01)
*B01D 53/32* (2006.01)
*F01N 3/027* (2006.01)

(52) U.S. Cl.
CPC ............... *F01N 3/08* (2013.01); *B01D 53/323* (2013.01); *F01N 3/0275* (2013.01); *B01D 2259/818* (2013.01)

(58) Field of Classification Search
CPC ... F01N 3/0275; F01N 13/009; F01N 13/011; F01N 2240/04; B01D 53/323; B01D 2259/818
USPC ........................................ 60/274; 422/186.04
See application file for complete search history.

(56) References Cited

U.S. PATENT DOCUMENTS

| | | |
|---|---|---|
| 8,157,902 B2 | 4/2012 | Ogut et al. |
| 2004/0219084 A1* | 11/2004 | Hall et al. ..................... 423/235 |
| 2007/0045101 A1* | 3/2007 | Ogut et al. .................... 204/177 |
| 2008/0092533 A1* | 4/2008 | Tennison ........................ 60/317 |
| 2009/0241775 A1* | 10/2009 | Ogut et al. ........................ 95/59 |

\* cited by examiner

*Primary Examiner* — Audrey K Bradley
(74) *Attorney, Agent, or Firm* — Andrew J. Anderson, Esq.; Harter Secrest & Emery LLP

(57) ABSTRACT

An exhaust treatment apparatus (ATA) is provided for reducing one or more components of the airstream directed through the ATA. The ATA includes at least one corona/NTP generating region, wherein at least one component of the airstream is reduced upon passing through the ATA. A method is provided for using the ATA for treating an airstream, including an exhaust airstream from a combustion engine, as well as an exhaust airstream from a compression-ignition (diesel) engine.

20 Claims, 9 Drawing Sheets

AIRSTREAM TREATMENT APPARATUS (ATA) AND METHODS OF USE THEREOF

BACKGROUND OF THE INVENTION

The present disclosure is particularly directed to an airstream treatment apparatus (ATA) for reducing one or more components of the airstream directed through the ATA. In a preferred embodiment, the ATA comprises at least one corona/Non-Thermal Plasma (NTP) generating region where at least one component of the airstream is reduced. The present disclosure is also directed to methods of using the ATA for treating an airstream, particularly the exhaust airstream from a combustion engine, and more particularly the exhaust airstream from a compression-ignition (diesel) engine.

Internal combustion engines generate a huge amount of toxic pollution and are subject to increasingly stringent emissions standards. Thus for example, carbon monoxide (CO), nitrogen oxides ($NO_x$), sulfur dioxide ($SO_2$), non-methane hydrocarbons (NMHCs) and particulate matter (PM) are subject to stringent emissions regulations, since these compounds result in significant human and environmental damage. See, e.g., U.S. Pat. No. 8,157,902, the contents of which is incorporated in its entirety by reference.

In light of the strict regulation of the emissions output of internal combustion engines, a large number of pollution control mechanisms have been implemented or explored for reducing these emissions. In this regard, some systems focus on the removal of already-generated emissions (e.g., catalytic converters, Diesel Particulate Matter (DPM) filters), while others instead alter engine function to reduce the actual generation of particular emission components. Thus, for example, Exhaust Gas Recirculation (EGR) systems decrease the temperature of combustion in the engine cylinders by recirculating a proportion of the exhaust stream back into the cylinder, thereby depriving the mixture in the cylinder of oxygen as well as providing a higher heat capacity mixture. Decreased combustion temperature is highly advantageous, in that less $NO_x$ is produced at this lower temperature; however, as for all of these systems there are tradeoffs, in this case the generation of greater PM as a result of lower combustion temperature.

One emission control system that has particular promise is a Non-Thermal Plasma (NTP) system, in which corona generated by high-voltage electrical energy is used to generate "cold" plasma, that is, non-equilibrium plasma where the electrons are "hot" while the other species in the plasma are thermally "cold." Although NTPs have been shown to have numerous beneficial effects on engine emissions, these systems are very sensitive to design parameters, e.g., they work poorly if the electrode distances are too great, or if carbonaceous material (soot) accumulation causes loss of electrical power via arcing. Thus for example, U.S. Pat. No. 8,157,902 describes an NTP system for the treatment of compressive ignition (diesel) exhaust where the most significant aspect of the design is that of a very elaborately designed and constructed "self-cleaning insulator".

In light of the above, it would be highly advantageous to develop better emission control devices, and in particular corona/NTP-based emission control devices.

BRIEF SUMMARY OF THE INVENTION

The present disclosure is directed to emission control devices, and in particular corona/NTP-based emission control devices, particularly an airstream treatment apparatus (ATA) for reducing one or more components of the airstream directed through the ATA. In a preferred embodiment, the ATA comprises at least one corona/NTP generating region where at least one component of the airstream is reduced. The present disclosure is also directed to methods of using the ATA for treating an airstream, particularly the exhaust airstream from a combustion engine, and more particularly the exhaust airstream from a compression-ignition (diesel) engine.

A first embodiment of the present disclosure is directed to an Airstream Treatment Apparatus (ATA) for altering the composition of the airstream directed through the ATA, the ATA comprising at least one corona/NTP generating region.

A second embodiment of the present disclosure is directed to the ATA of embodiment 1, where the alteration is a reduction of at least one component of the airstream directed through the ATA.

A third embodiment of the present disclosure is directed to the ATA of embodiment 2, where the airstream is the exhaust gas airstream of a combustion engine.

A fourth embodiment of the present disclosure is directed to the ATA of embodiment 3, where the combustion engine is a compressive-ignition combustion engine.

A fifth embodiment of the present disclosure is directed to the ATA of embodiment 1, where the at least one corona/NTP generating region comprises a corona cap.

A sixth embodiment of the present disclosure is directed to the ATA of embodiment 1, further comprising a corona/NTP generating bead bed.

A seventh embodiment of the present disclosure is directed to the ATA of embodiment 1, further comprising at least one gas or compound inlet.

An eighth embodiment of the present disclosure is directed to the ATA of embodiment 7, where the at least one gas or compound inlet is activated under computer control in response to sensed conditions.

A ninth embodiment of the present disclosure is directed to the ATA of embodiment 7, where the at least one gas or compound inlet is activated under computer control in response to algorithmic (lookup) conditions.

A tenth embodiment of the present disclosure is directed to a method for treating an airstream, comprising passing the airstream through at least one ATA of embodiment 1.

An eleventh embodiment of the present disclosure is directed to the method of embodiment 10, where the airstream flows through more than one ATA, where the more than one ATAs are arranged in parallel.

A twelfth embodiment of the present disclosure is directed to the method of embodiment 10, where the airstream flows through more than one ATA, where the more than one ATAs are arranged serially.

A thirteenth embodiment of the present disclosure is directed to the method of embodiment 10, where the composition of the airstream is altered so as to reduce particulate matter (PM) in the airstream.

A fourteenth embodiment of the present disclosure is directed to the method of embodiment 13, where the reduction in particulate matter is between 80-99% (incrementing by 1%).

A fifteenth embodiment of the present disclosure is directed to the method of embodiment 14, where the reduction in particulate matter is at least 85%.

A sixteenth embodiment of the present disclosure is directed to the method of embodiment 14, where the reduction of particulate matter is determined by gravimetric analysis.

A seventeenth embodiment of the present disclosure is directed to the method of embodiment 14, where the reduction in particulate matter is at least 95%.

An eighteenth embodiment of the present disclosure is directed to the method of embodiment 14, where the reduction of particulate matter is determined by gravimetric analysis.

BRIEF DESCRIPTION OF THE SEVERAL VIEWS OF THE DRAWING

The drawings provided in the present disclosure are provided solely to better illustrate particular embodiments of the present disclosure, and specifically do not provide an exhaustive or limiting set of embodiments of the present disclosure.

FIG. 4 further shows an airstream input of diesel engine exhaust & soot—this is a preferred but non-limiting embodiment of one application of the ATA of the present disclosure, and other airstreams are contemplated.

DETAILED DESCRIPTION OF THE INVENTION

Figure 1:
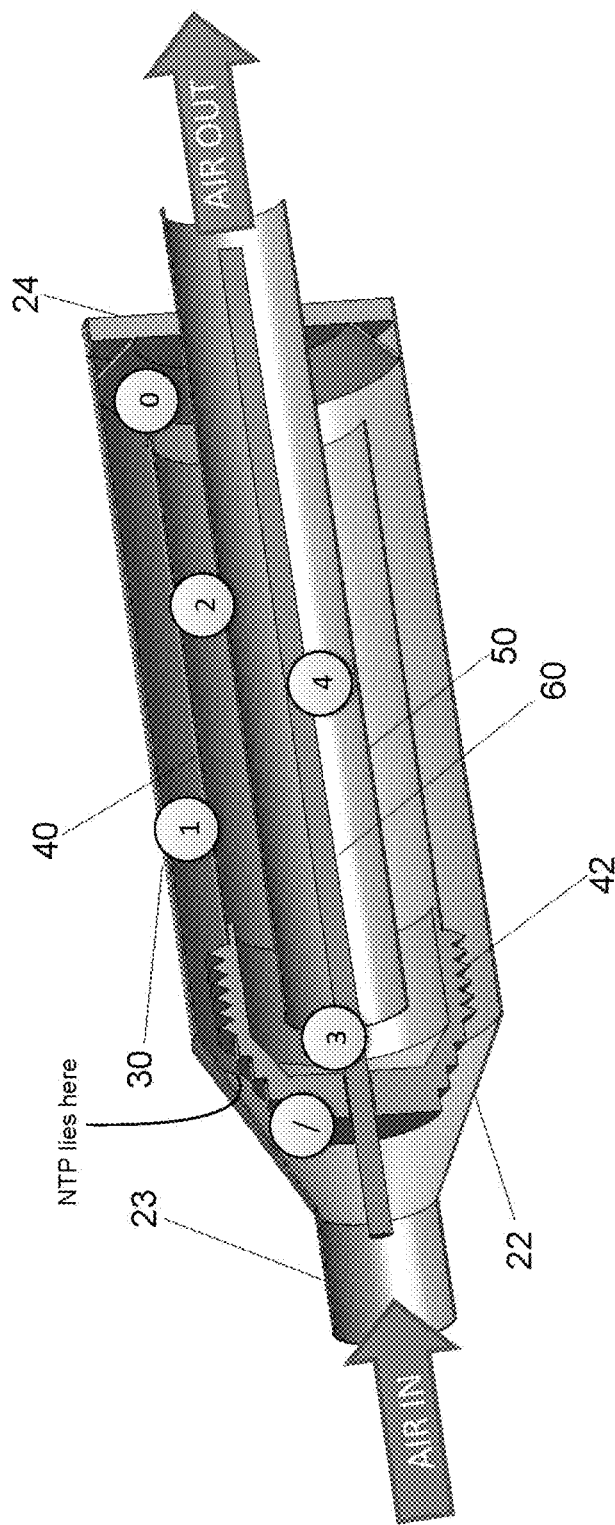
FIG. 1 provides a schematic of one embodiment of the ATA of the present disclosure. Numbered regions 1-6 indicate areas of airstream flow further detailed in FIG. 2. Dorsal surfaces of an outer can, corona sleeve and inner sleeve are indicated in the figure; the other (ventral) surfaces are unmarked in this figure.

Note that in the present disclosure, "a" or "an" are explicitly not limited to the singular form; instead, "a" and "an" are explicitly intended to be synonymous with "at least—but not limited to—one instance of" the term being referenced. Note also that, unless otherwise indicated, a range will be given as the beginning and end of the range and also the contemplated increment for the contemplated intermediate value(s) between the beginning and end of the range. Thus a phrase of the general form "a range of 5-50% (incrementing by 0.001%)" refers to a contemplated series of 5%, 5.001%, 5.002%, 5.003%, etc. (incrementing by 0.001% increments) up to the end value of 50%; a phrase of the form "less than about 5% decrementing by 0.01% decrements" refers to a contemplated series of 5%, 4.99%, 4.98%, etc. Note that "increment" and "interval" may be used synonymously, as may other synonymous usages.

Note that the present application may refer to "proximal," "distal," "dorsal" or "ventral" regions/surfaces of an ATA 10 of the present disclosure. In this regard and as shown in, e.g., FIG. 1, "proximal" refers to an area more towards an "AIR IN" end 12 of the ATA 10, with the "proximal cap" 22 being an example of a proximal component of the ATA. By contrast, "distal" refers to areas/components of the ATA 10 that are disposed towards an "AIR OUT" end 14 of the ATA, with a "distal cap" 24 being an example of such a distal component of the ATA. As FIG. 1 also shows, "dorsal" refers to areas/components of the ATA 10 disposed more to the exterior of the ATA, e.g., the "dorsal" surface of an outer can 30 is the outermost surface of the outer can. By contrast, "ventral" refers to areas/components that are disposed more to the interior of the ATA 10; for example, under this terminology the surface of an inner sleeve 50 facing a corona sleeve 40 would be the dorsal surface, whereas the surface of the inner sleeve facing a coupler electrode 60 would be the ventral surface.

The present disclosure is particularly directed to the exhaust treatment apparatus (ATA) 10 reducing one or more components of the airstream directed through the ATA. In a preferred embodiment, the ATA 10 comprises at least one corona/NTP generating region 80 where at least one component of the airstream is reduced. The present disclosure is also directed to methods of using the ATA 10 for treating an airstream, particularly the exhaust airstream from a combustion engine, and more particularly the exhaust "Airstream" as used herein refers generically to the flow of gases and materials entrained therein that the ATA 10 treats by altering a composition of the airstream. Thus, for a compressive ignition (diesel) engine, the "airstream" to be treated typically comprises a mixture of ambient air with various emissive components (CO, $NO_x$, $SO_2$, NMHCs, PM, etc). It is understood the "airstream" may have a different composition depending upon the location in the respective exhaust system, as shown for example in the various locations for the ATA 10 in FIG. 8. It is further understood the airstream composition is also likely different as a function of engine temperature (e.g., cold-start), engine load, altitude etc.

The term "alteration of the composition" of the airstream refers to both reductions and also possibly increases in at least one component of the airstream, where the reduction/increase is accomplished by exposure of the airstream to the ATA 10. In general the ATA 10 will reduce at least one component of the airstream—e.g., the ATA will in one embodiment reduce the amount of PM in the airstream. However, because of the complex chemical interactions between various airstream components, in some circumstances it may be advantageous to increase one component, in order that later reactions can be facilitated by that increase.

"Reduction" of at least one airstream component refers generally to the reduction of the fraction of the airstream that the component(s) represents. Thus, reduction can be measured by a variety of assays including (without limitation), % of gases, gravimetric analysis, mass component as well as volume. For some components such as PM, "reduction" may refer to the conversion of one form of the material to another, e.g., from large particles to finer particles. In this regard Applicants note that fine particulates may actually have a higher safety risk than larger particulates (nanoparticles have an increased ability to penetrate deep into the lungs), however, conversion of PM to fine PM may be advantageous in situations where the fine PM is more readily treated (e.g., when the fine PM is passed back through the EGR into the engine cylinders).

The ATA 10 uses corona/NTP to treat the airstream passing through the ATA; therefore, one aspect of the present disclosure is directed to power supplies compatible with the generation of this corona/NTP. In this regard, Applicants note that power supply design will be somewhat dependent upon the airstream to be treated; for engine exhaust gas situations, for example, there will likely be particular designs necessary to prevent arcing from carbonaceous material (soot) accumulation, e.g., very short power supply pulses. Generally important parameters include, for example: applied voltage; voltage polarity to the ATA 10 (corona cap 42 and electrically coupled elements positive versus negative); waveform of applied voltage (sine, square, etc.); for pulsed power (a preferred embodiment), rise time and pulse width; etc. U.S. Pat. No. 8,157,902 provides a number of examples of power supply output specifications that are contemplated in the present disclosure.

Prophetic Example 1

The present disclosure is particularly directed to the ATA 10 for reducing one or more components of the airstream directed through the ATA as seen in the embodiment of FIG. 1. Specifically, FIG. 1 and particularly the enlarged view of this embodiment as presented in FIG. 2 show the ATA 10 in which: air is introduced through a proximal adapter 23 of the ATA ("AIR IN" in the figures); flows over the corona cap 42 and immediately surrounding region (1)—between the dorsal side of the corona cap and the ventral side of the proximal cap 22; flows through region (2)—between the ventral side of the outer can 30 and a dorsal side of the corona sleeve 40; flows from region (2) through region (3)—partially bounded by the distal cap 24 and into region (4)—between a ventral side of the corona sleeve 40 and a dorsal side of the inner sleeve 50; flows through region (4); flows from region (4) through region (5)—partially bounded by the corona cap 42 and into region (6)—between a ventral side of the inner sleeve 50 and a dorsal side of the coupler electrode 60; and, flows through region (6) and through the "AIR OUT" end 14 of the ATA.

Figure 6:
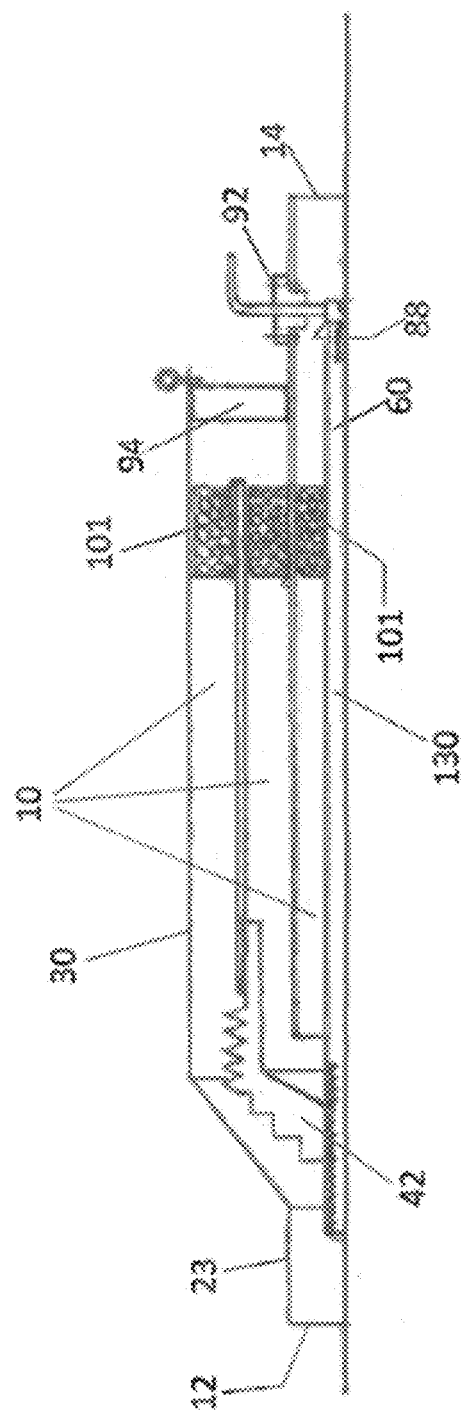
FIG. 6 provides a schematic of a "MOD 1" type embodiment of the disclosure, showing airstream flow through the upper half of the ATA, including past the connection point of the coupler electrode to the external power supply. Note that figure shows an airstream input of engine exhaust—this is a preferred but non-limiting embodiment of one application of the ATA of the present disclosure, and other airstreams are contemplated.
Figure 7:
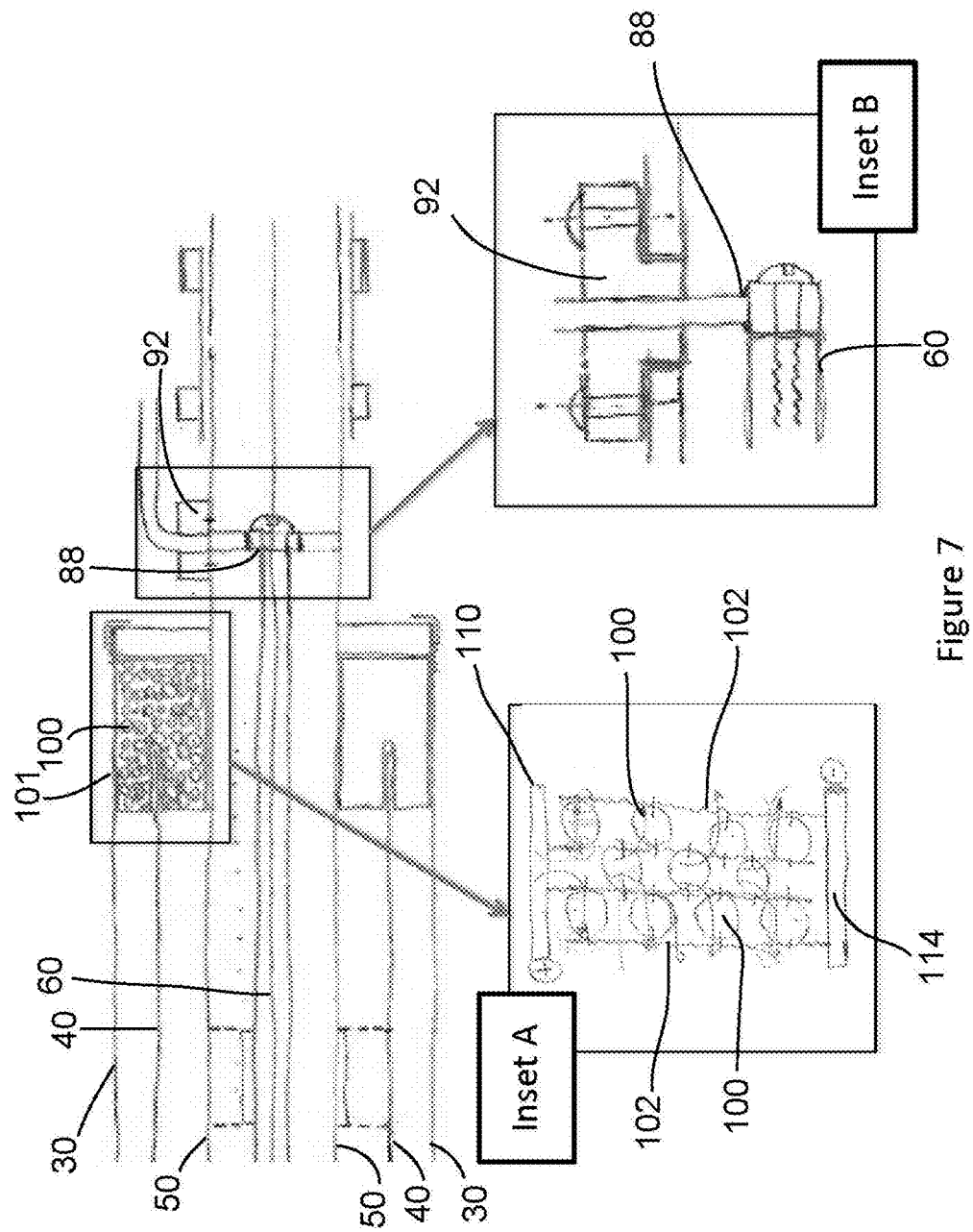
FIG. 7 provides an exploded view of the ATA shown in FIG. 6, with inset A showing one embodiment of the "treatment beads" and inset B showing one embodiment of the connection point of the coupler electrode to the external power supply.
Figure 8:
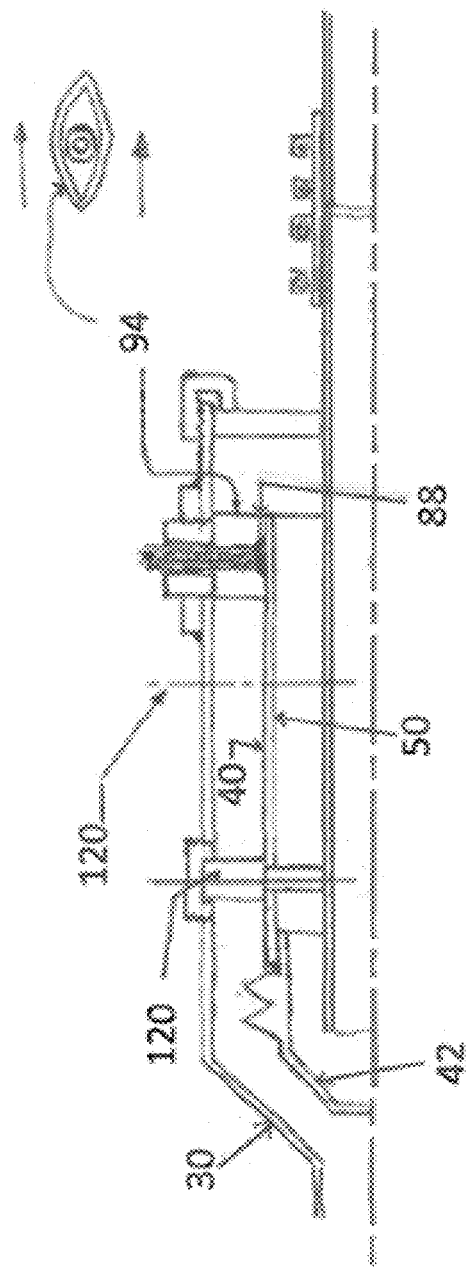
FIG. 8 provides another embodiment of the ATA of the present disclosure, where this embodiment provides a different entry point for the electrical connection to the corona cap and corona sleeve; note that in light of this alternative connection scheme, in this embodiment the coupler electrode has been eliminated as superfluous.

This embodiment has a number of features which, while non-limiting, are preferable to the ATA 10: 1) corona generation (and therefore NTP production) is designed to occur primarily at the corona cap 42, by way of the shape of the cap (i.e., with sharp ridges (a plurality of apexes or vertices) that encourage corona generation) and a relatively short distance of the corona cap 42 from the ventral surface of the proximal cap 22 (at least a shorter distance than between the outer can 30 and the corona sleeve 40, and between the corona sleeve and the inner sleeve 50; 2) corona generation is designed to be generally limited elsewhere in the ATA (chiefly by appropriately great spacing of the internal components of the ATA); 3) in light of #1 and #2, extensive exposure of the airstream to NTP occurs in the region of the corona cap or shortly downstream of this region; and, 3) the connection of the ATA to an external power supply 86 is designed to minimize power loss via arcing or other electrical current flow, with this configuration including (but not limited to) location of a connection point 88 to the electrical power supply far downstream of the corona cap 42 (see, e.g., FIGS. 6-7) or shielding in combination with a streamlined flow guide (FIG. 8).

Figure 2:
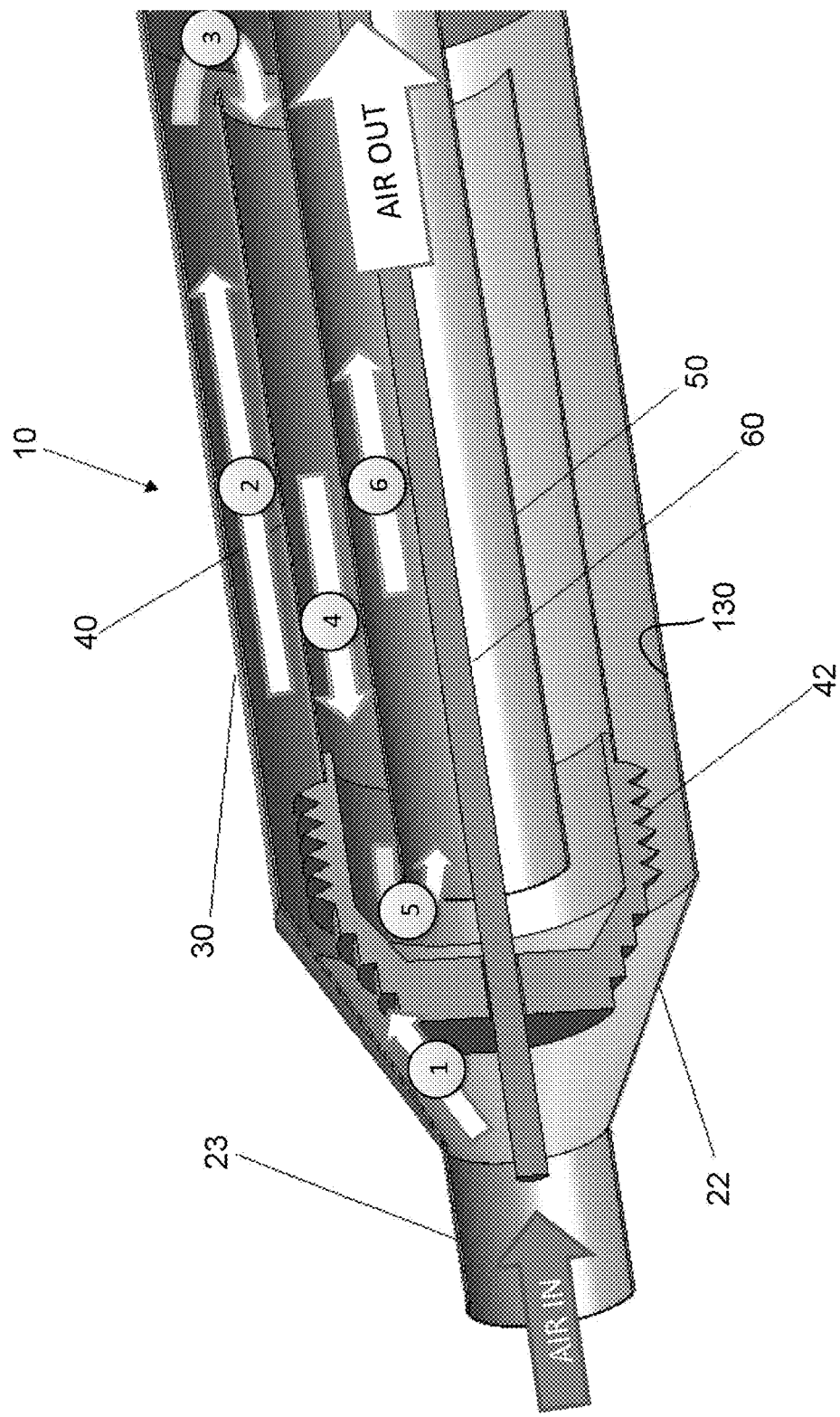
FIG. 2 provides an exploded view of the ATA of FIG. 1; in this schematic, the airstream flow for each of marked regions 1-6 is shown by the arrows. Note that only the airstream flow for the top half of the ATA is shown in this figure, and that in fact airstream flow similarly occurs for the lower (symmetric) half of the ATA left unmarked.
Figure 3:
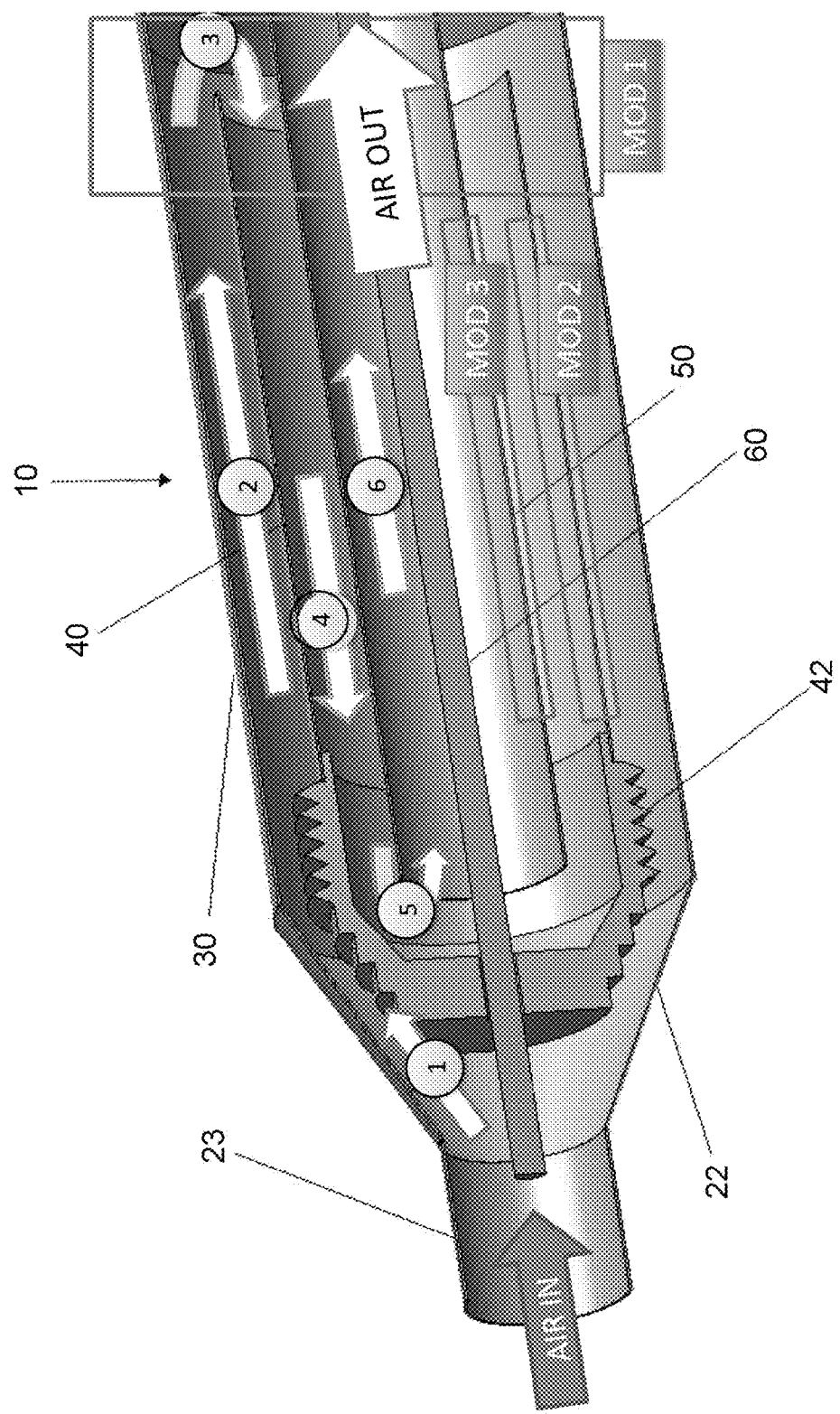
FIG. 3 provides the schematic of FIG. 2 altered to show three regions ("MOD 1" to "MOD 3") of the ATA that may be modified in various embodiments of the disclosure. Note that solely for visual clarity the "MOD 2" and "MOD 3" modifications are shown as occurring in regions that end before the most distal end of either the corona sleeve or the inner sleeve, and that in fact the present disclosure contemplates these modifications as possibly extending all the way to the distal ends of these sleeves. See, e.g., FIG. 5, which shows only a particular modification of the corona sleeve, with that modification occurring fully at the distal end of the corona sleeve ("MOD 2" in FIG. 5). Note that other modifications are contemplated for this ATA, e.g., the "MOD 4" modification in FIG. 5.

FIGS. 1 and 2 show that in this embodiment the corona cap 42 attaches to both the corona sleeve 40 and also the coupler electrode 60, where the coupler electrode serves to electrically connect the corona cap/corona sleeve assembly to the electrical power supply 86 external to the ATA 10. These figures do not show the exact configuration of the connection of the coupler electrode 60 to the external power supply 86, however FIG. 6 and FIG. 7 (particularly inset B) provide non-limiting embodiments of this connection. Note that in connection 88, the electrical input from the external power supply 86 is routed through an insulator 92 in order to reach the interior of the ATA 10 and connect to the coupler electrode 60, and that the design of this coupling is determined by the need to minimize electrical loss via non-corona generating conduction (e.g., arcing) at this point in the ATA and possibly also to provide sufficient mechanical coupling strength, e.g., as occurs when this connection point serves as the sole or primary support for the corona cap 42/corona sleeve 40/coupler electrode 60 subassembly.

Further with regard to this connection, Applicants note that in this embodiment this connection point 88 is positioned relatively far downstream in the ATA 10 from the point (or points in some embodiments) of corona/NTP production, in order to increase or maximize the prior exposure of the airstream to corona/NTP treatment prior to the airstream passing around the connection point 88.

In this regard, previous work with exhaust treatment assemblies reveals the sensitivity of this connection point 88 to electrical loss by arcing, and illustrates the lengths various workers have undertaken to prevent such loses by elaborated designs of these connections. Thus, for example in U.S. Pat. No. 8,157,902 a very specific connector design was implemented in which the insulator was thinned and provided with a variety of components in order to be "self-cleaning" of accumulated conductive particulates (carbonaceous soot) from the airstream. The present system generally seeks to avoid the need for such elaborate designs by 1) placing the connector 88 downstream of the corona/NTP treatment region (or regions) or design involving shielding in combination with a flow director 94 (FIG. 8 provides a non-limiting example); 2) by designing this treatment region or regions to be as efficient at removing conductive particulates as possible; and, 3) by using different forms of corona/NTP treatment region when desirable—see e.g., the embodiments below.

Prophetic Example 2

Various "MODS" of the ATA

FIGS. 3-7 show a number of non-limiting locations where the ATA 10 provided in prophetic Example 1 above may be further modified—these non-limiting locations are given as "MOD 1," "MOD 2," "MOD 3" and "MOD 4."

Figure 4:
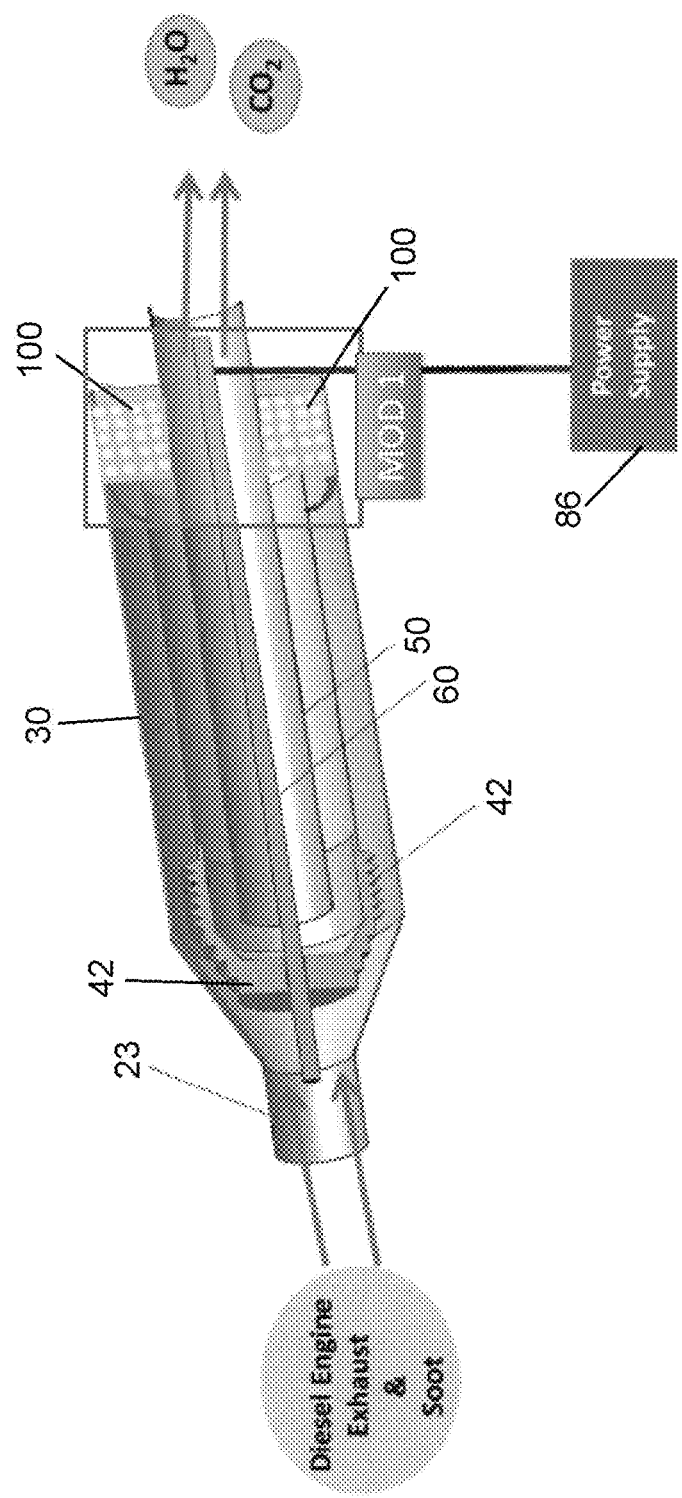
FIG. 4 provides an example of a "MOD 1" alteration to the basic ATA embodied in FIG. 1. In this embodiment, a bed of "treatment beads" is provided in the region including marked region 3 of the ATA. In this figure these treatment beads are shown in a regular array; note that this is only one (non-limiting) embodiment of the disclosure, and that non-regular arrays are also contemplated, as are a mixture of bead sizes, for example.

FIG. 4, for example, provides an example of a "MOD 1" type modification; in this embodiment, one or more "treatment beads" 100 are inserted into region (3), including into region (3) only, as well as part of regions (2) and (4) as well as region (3) (and note that other embodiments are explicitly contemplated). The intended function of this bead 100 or bead bed 101 is to afford a site within the ATA 10 for additional exposure of the airstream to corona/NTP, where this additional exposure will act to reduce one or more components of the airstream. In one embodiment (see FIG. 7, inset A), the beads 100 are placed in a wire mesh screen 102 with sufficient transverse distance separating the beads so that clogging and flow loss of airstream through the beads is minimized. The beads 100 are supported in a positive (+) charged electrode 110 on one side and a negative (−) charged electrode 114 on the other side. Local coronas will develop at bead contact points with the wire mesh 102, further enhancing the plasma generation of this embodiment and providing additional corona/NTP treatment of the airstream passing through the bead bed 101. Although Applicants contemplated a variety of beads 100 for use in the ATA 10, in a preferred embodiment the beads are nominally spherical (c. 1 cm diameter), and are made of a non-glazed refractory-type ceramic material. See additionally FIGS. 6-7 for other examples of the bead bed 101.

Figure 5:
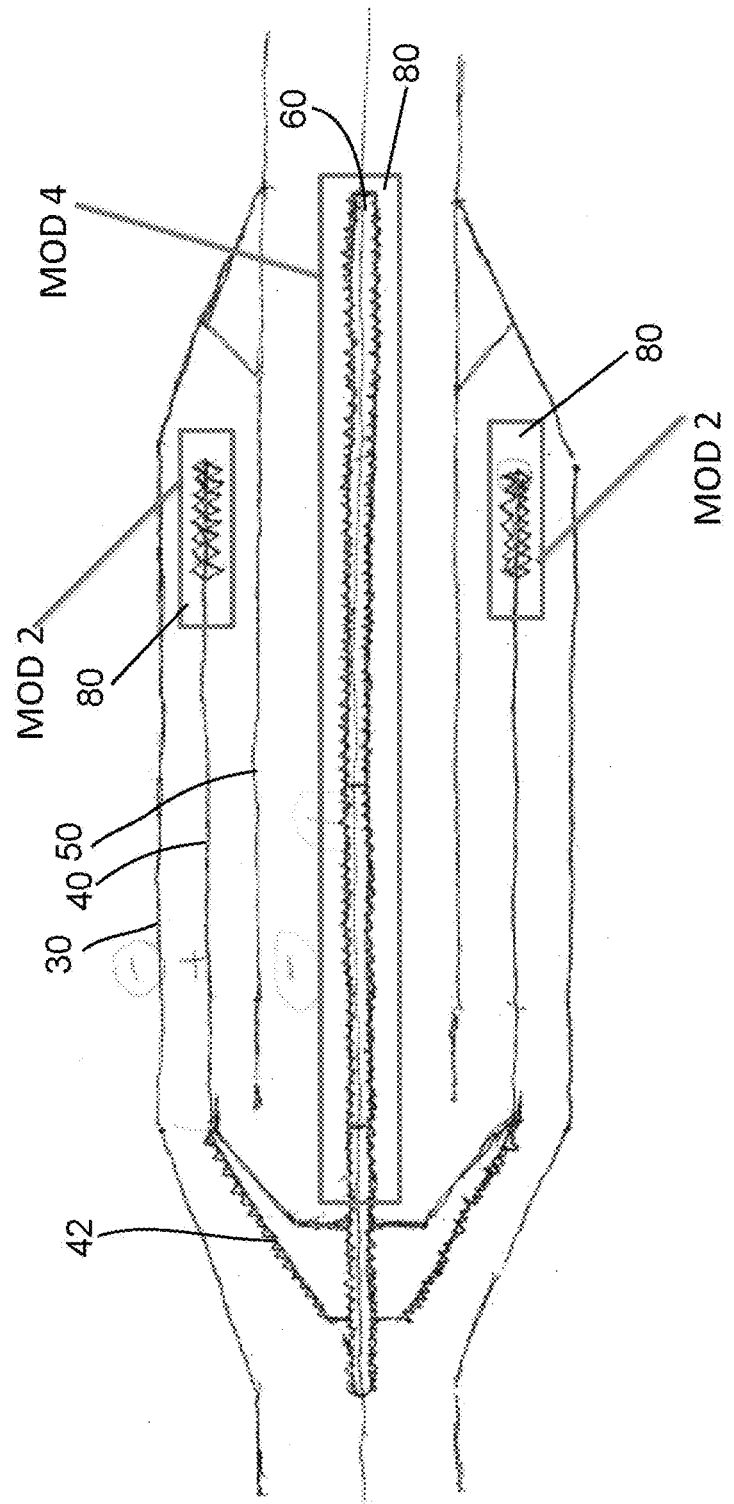
FIG. 5 provides non-limiting examples of "MOD 2" and "MOD 4" type modifications to the ATA; in these modifications corona/NTP generating combs/teeth have been added either at a distal end of the corona sleeve, along the entire length of the coupler electrode, or both of these modifications in combination.

In addition to the "MOD 1" changes discussed above, other non-limiting variants of the ATA 10 may be obtained by "MOD 2"-"MOD 4" changes. FIG. 5, for example, shows various "MOD 2" and "MOD 4" modifications to the ATA; the changes shown create more sharp points for generation of corona/NTP.

Prophetic Example 3

ATA without Coupler Electrode

FIG. 8 provides a modified version of the ATA 10 in which guide posts 120 support the internal components of the ATA and electrical connectivity to the corona cap 42 and electrically connected components is obtained by a different placement of the electrical connection 88 from the external power supply 86. Since these posts 120 and electrical connector 88 provide the support/electrical connectivity functions supplied in other embodiments by the coupler electrode 60, in this embodiment the coupler electrode has been eliminated.

Applicants note that in this embodiment particular attention has been paid to the materials selection for the guide posts 120—specifically the material must be non-conductive and able to tolerate high temperatures—and to various aspects of the electrical connection, e.g., the use of a streamlined flow guide.

Prophetic Example 4

ATA with Additional Inlets/Plumbing

The accompanying figures provide several embodiments of ATA 10; however, these should not be taken as a limiting set of the ATA contemplated. For example, the ATA 10 may additionally include at least one catalytic surface 130 on which one or more catalytic reactions may occur, with standard catalysts such as platinum, palladium, etc., being non-limiting examples of this at least one catalytic surface.

In another embodiment, the ATA 10 may include one or more compound inlets for introducing one or more compound into the ATA, thereby altering ATA function. For example it may be advantageous in some situations to modify the ATA 10 to have a separate inlet(s) for ambient air, in order that more oxygen be available in the airstream for (e.g.) ozone generation. Applicants note that other compounds apart from or in addition to ambient air may be introduced in order to obtain altered ATA behavior, for example recirculated exhaust gas (in the case of an ATA used to treat the airstream of a combustion engine), pure gas (e.g., pure oxygen or other gas), aerosolized or otherwise dispersed organic compound, etc. Applicants also note that this introduction may be continuous, or it may be regulated, e.g., by way of a control valve or valves (not shown). Thus, in such an embodiment the ATA 10 may be altered in response to changing conditions of the exhaust stream to form a "smart" ATA, i.e., an ATA with a function that is varied in real-time to provide a different treatment function for the airstream passing through it.

Prophetic Example 5

Methods Involving the ATA: "Dumb" and "Smart" ATAs

The ATA 10 is particularly directed to airstream treatment, particularly airstream treatment to reduce one or more components of the airstream directed through the ATA.

Figure 9:
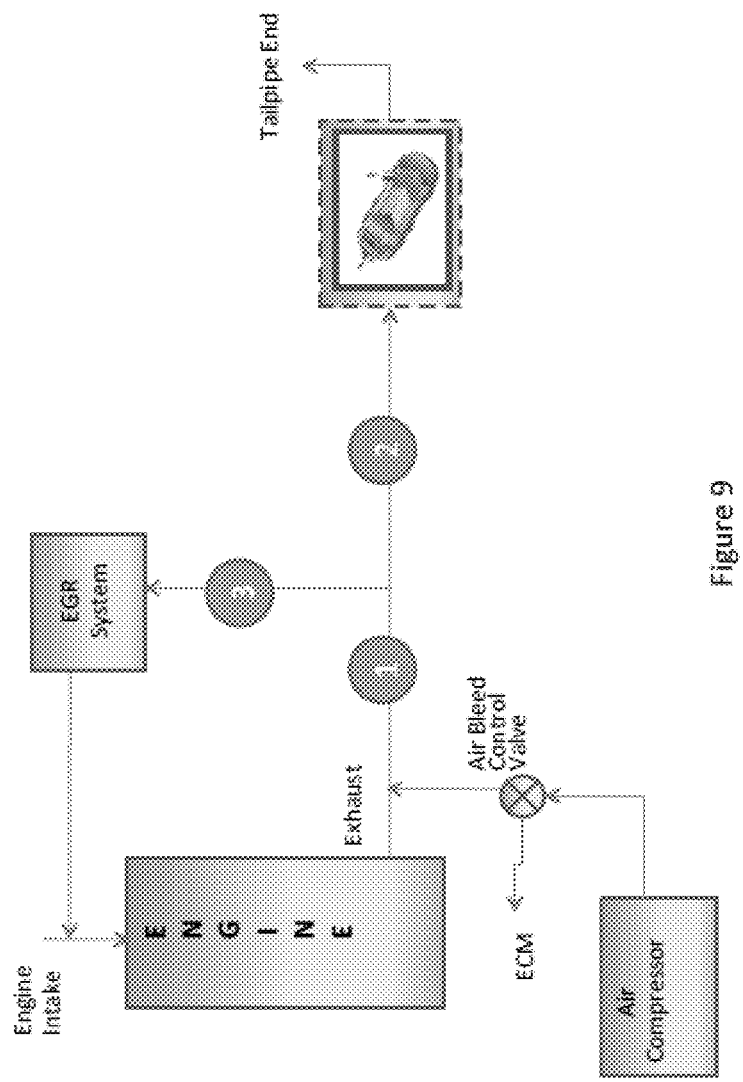
FIG. 9 provides a schematic showing three exemplary locations for the ATA of the present disclosure: upstream of the tap for the EGR loop (when present) (1); downstream of the EGR tap and upstream of a diesel particulate filter (DPF), if present (2); and, within the EGR loop (3). Thus, pursuant to this schematic, the combination of more than one ATA can be employed, as set forth below.

In this regard, the ATA 10 is particularly applicable to the treatment of combustion engine exhaust airstreams, e.g., the exhaust gas stream from a gasoline or most particularly a diesel compressive-ignition engine. FIG. 9 shows a number of points in a modern diesel engine exhaust system where one or more ATAs may be integrated in order to accomplish treatment of the exhaust airstream. Additional examples of such configurations explicitly contemplated herein may be found in U.S. Pat. No. 8,157,902.

Applicants note that the one or more ATAs 10 integrated into the exhaust stream may include both "dumb" and "smart" ATAs. Specifically, a "dumb" ATA 10 is an ATA which does not have any mechanisms for changing/tuning its operation based on changing airstream composition or on external trigger conditions; by contrast, a "smart" ATA does have mechanisms for changing/tuning its operation in response to such composition or trigger conditions.

Thus, for example, it may be advantageous to have an ATA 10 (or more than one ATA) which increases its corona/NTP generation when PM in the airstream increases, a situation that is common on cold startup of the engine or on heavy engine loading (i.e., going from a flat road to a hill). In one embodiment, the ATA 10 may accomplish such increased corona/NTP generation by design of the power supply 86 or by design of its internal components.

In other designs, the ATA 10 may accomplish treatment of such excess PM by sensing such an increase and gating in more ambient air or even stored gasses (see Prophetic Example 4); this sensing/gating may be accomplished by internal (mechanical) ATA mechanisms or it may be under external computer control, e.g., controlled via one of the onboard computer control mechanisms that are integral to modern diesel and gasoline engines. These examples are non-limiting, and Applicants expressly contemplate other such systems.

Applicants also note that the present disclosure also explicitly contemplates "serial" configurations of one or more ATAs 10, in which the "AIR OUT" of the first ATA is connected to the "AIR IN" of the second ATA, etc. The present disclosure also encompasses "parallel" arrangements in which an airstream is split into multiple flows by a splitter manifold, and each of the multiple flows is then directed through an ATA 10, one for each flow.

The following embodiments provide a non-limiting list of some of the embodiments of the present disclosure. Other embodiments are presented elsewhere herein.

What is claimed is:

1. An apparatus comprising:
   an Airstream Treatment Apparatus (ATA) having an airstream inlet, an airstream outlet, and an airstream path directed through the ATA from the airstream inlet to the airstream outlet, the ATA having at least one corona NTP generating region for altering a composition of an airstream passing through the ATA,
   wherein the ATA comprises an outer can, and a corona cap and corona sleeve within the outer can,
   wherein an area between the outer can and the corona cap and corona sleeve forms at least a part of the airstream path directed through the ATA,
   where the corona sleeve extends from the corona cap in a direction downstream from the corona cap, and
   wherein the corona cap comprises a plurality of apexes or vertices that encourage corona generation positioned around the corona cap and directed towards the outer can.

2. The ATA of claim 1, further comprising a corona NTP generating bead bed.

3. The ATA of claim 1, wherein the corona cap comprises sharp ridges that encourage corona generation.

4. The ATA of claim 1, wherein there is a relatively shorter distance between the corona cap and the outer can than a distance between the corona sleeve and the outer can downstream of the corona cap, such that corona generation is designed to occur primarily at the corona cap by way of the plurality of apexes or vertices positioned around the corona cap.

5. The ATA of claim 4, wherein the corona cap comprises sharp ridges that encourage corona generation.

6. The ATA of claim 1, further comprising at least one gas or compound additional inlet separate from the airstream inlet.

7. The ATA of claim 6, where the at least one gas or compound additional inlet is activated under computer control in response to sensed conditions.

8. The ATA of claim 6, where the at least one gas or compound additional inlet is activated under computer control in response to algorithmic (lookup) conditions.

9. The ATA of claim 1, wherein the altering the composition is a reduction of at least one component of the airstream.

10. The ATA of claim 9, where the airstream is an exhaust gas airstream of a combustion engine.

11. The ATA of claim 10, where the combustion engine is a compressive-ignition combustion engine.

12. A method for treating an airstream, comprising passing the airstream through at least one ATA of claim 1.

13. The method of claim 12, where the airstream flows through more than one ATA, wherein the more than one ATAs are arranged in parallel.

14. The method of claim 12, where the airstream flows through more than one ATA, wherein the more than one ATAs are arranged serially.

15. The method of claim 12, where the composition of the airstream is altered so as to reduce particulate matter (PM) in the airstream.

16. The method of claim 15, where the reduction in particulate matter is between 80% to 99%.

17. The method of claim 16, where the reduction in particulate matter is at least 85%.

18. The method of claim 16, where the reduction of particulate matter is determined by gravimetric analysis.

19. The method of claim 16, where the reduction in particulate matter is at least 95%.

20. The method of claim 19, where the reduction of particulate matter is determined by gravimetric analysis.

* * * * *